US012536757B2

(12) United States Patent
Kim

(10) Patent No.: US 12,536,757 B2
(45) Date of Patent: Jan. 27, 2026

(54) AUGMENTED REALITY DEVICE AND ELECTRONIC DEVICE INTERACTING WITH AUGMENTED REALITY DEVICE

(71) Applicant: Samsung Electronics Co., Ltd., Suwon-si (KR)

(72) Inventor: Jinman Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 18/494,867

(22) Filed: Oct. 26, 2023

(65) Prior Publication Data
US 2024/0054740 A1   Feb. 15, 2024

Related U.S. Application Data

(63) Continuation of application No. PCT/KR2022/005049, filed on Apr. 7, 2022.

(30) Foreign Application Priority Data

Apr. 30, 2021  (KR) .......................... 10-2021-0056918

(51) Int. Cl.
*G06T 19/00*   (2011.01)
*G06V 10/141*  (2022.01)

(52) U.S. Cl.
CPC .......... *G06T 19/006* (2013.01); *G06V 10/141* (2022.01)

(58) Field of Classification Search
CPC ..................... G06T 19/006; G06T 7/70; G06T 2207/20081; G06T 2207/20084;
(Continued)

(56) References Cited

U.S. PATENT DOCUMENTS 10,403,050 B1 * 9/2019 Beall ..................... G06T 7/292
2009/0015791 A1 * 1/2009 Chang .................. G03B 21/005
353/6
(Continued)

FOREIGN PATENT DOCUMENTS

CN          106168855 A      11/2016
KR       20100101333 A  *  9/2010   ........... H04N 13/327
(Continued)

OTHER PUBLICATIONS

International Search Report for PCT/KR2022/005049 mailed Jul. 18, 2022, 5 pages.
(Continued)

*Primary Examiner* — Sarah Lhymn
(74) *Attorney, Agent, or Firm* — Nixon & Vanderhye P.C.

(57) ABSTRACT

According to various embodiments, an augmented reality device may comprise: at least one camera, a communication circuit, a display, and at least one processor, wherein the at least one processor is configured to: acquire, through the at least one camera, a first image including a pattern of light emitted from an electronic device; receive information on the pattern from the electronic device through the communication circuit; identify at least one of the tilt and position of a display area of the electronic device based on the first image and information on the pattern; and display a virtual object on the display based on at least one of the tilt and position of the display area of the electronic device.

20 Claims, 11 Drawing Sheets

(58) Field of Classification Search
CPC . G06T 2207/10016; G06T 2207/10024; G06T 2207/10048; G06V 10/141; G06V 20/20; G02B 2027/0138; G02B 2027/0178; G02B 27/0172; H04M 1/02; H04M 1/0264; H04N 13/332
See application file for complete search history.

(56) References Cited

U.S. PATENT DOCUMENTS

| | | | |
|---|---|---|---|
| 2012/0143551 A1* | 6/2012 | Burkland | F41G 7/226 |
| | | | 702/116 |
| 2013/0182012 A1 | 7/2013 | Kim et al. | |
| 2016/0140930 A1* | 5/2016 | Pusch | G06F 3/011 |
| | | | 345/633 |
| 2017/0011553 A1 | 1/2017 | Chen et al. | |
| 2017/0178272 A1* | 6/2017 | Lashkari | G06T 1/20 |
| 2017/0186146 A1* | 6/2017 | Raniwala | H04N 23/60 |
| 2017/0249726 A1 | 8/2017 | Rochford et al. | |
| 2017/0295362 A1* | 10/2017 | Travis | H04N 13/128 |
| 2018/0306898 A1* | 10/2018 | Pusch | G06F 3/014 |
| 2019/0094981 A1* | 3/2019 | Bradski | G06V 40/168 |
| 2019/0278098 A1 | 9/2019 | Prest et al. | |
| 2020/0410769 A1 | 12/2020 | Lee et al. | |
| 2021/0227143 A1* | 7/2021 | Wang | G06T 7/80 |

FOREIGN PATENT DOCUMENTS

| | | | | |
|---|---|---|---|---|
| KR | 20120124325 A | 11/2012 | | |
| KR | 20170130580 A | 11/2017 | | |
| KR | 20190024174 A | * | 3/2019 | G06T 19/006 |
| KR | 20190101827 A | 9/2019 | | |
| KR | 20190106640 A | 9/2019 | | |

OTHER PUBLICATIONS

Written Opinion of the ISA for PCT/KR2022/005049 mailed Jul. 18, 2022, 5 pages.
Korean Office Action dated Jun. 20, 2025 for KR Application No. 10-2021-0056918.

* cited by examiner

AUGMENTED REALITY DEVICE AND ELECTRONIC DEVICE INTERACTING WITH AUGMENTED REALITY DEVICE

CROSS-REFERENCE TO RELATED APPLICATIONS

This application is a continuation of International Application No. PCT/KR2022/005049 designating the United States, filed on Apr. 7, 2022, in the Korean Intellectual Property Receiving Office and claiming priority to Korean Patent Application No. 10-2021-0056918, filed on Apr. 30, 2021, in the Korean Intellectual Property Office, the disclosures of each of which are incorporated by reference herein in their entireties.

BACKGROUND

Field

The disclosure relates to an augmented reality device and an electronic device interacting with an augmented reality device.

Description of Related Art

Augmented reality (AR) is a technology which overlays a three-dimensional (or two-dimensional) virtual object on a real image or background and shows both as a single image. Augmented reality technology in which a real environment and a virtual object are mixed allows a user to see a real environment, thereby providing a better sense of reality and additional information.

In an augmented reality device, an image provided by a projector may be incident to an input grating surface via a prism. A user may then visually see the image passing via the output grating surface. The user may observe the image together with the actual environment, for example, to check information about an object in the currently observed environment.

A virtual object displayed by an augmented reality device may include a virtual screen related to another electronic device. For example, as shown in FIG. 1A, an augmented reality device 110 may display virtual objects 140 and 150 related to an electronic device 130. The virtual objects 140 and 150 may represent execution screens of applications executed in the electronic device 130. A user 120 may use the electronic device 130 and the virtual objects 140 and 150 via the augmented reality device 110 to be provided with a plurality of windows, similar to how the display of the electronic device 130 is expanded.

When the augmented reality device 110 displays a virtual object, it is required to display the virtual object at an appropriate location or display the virtual object with an appropriate tilt.

Referring to FIG. 1B, a plurality of electronic devices 160 and 170 may be located within an image acquired by a camera of the augmented reality device 110, e.g., a field of view (FOV) of the user 120 wearing the augmented reality device 110. The augmented reality device 110 is required to determine around which of the plurality of electronic devices 160 and 170 in the acquired image a virtual object is to be displayed.

SUMMARY

Embodiments of the disclosure provide an augmented reality that may receive information about a light pattern from an electronic device which emits light of a designated pattern, and based on the received light pattern information and the image acquired through the camera of the augmented reality device, at least one of the tilt or position of a display area of the electronic device may be identified.

An augmented reality device according to an example embodiment may include: at least one camera, a communication circuit, a display, and at least one processor, wherein one or more of the at least one processor is configured to: acquire a first image including a pattern of light emitted from an electronic device via the at least one camera, receive information about the pattern from the electronic device via the communication circuit, identify at least one among a tilt or a position of a display area of the electronic device based on the first image and information about the pattern, and display a virtual object on the display based on at least one among the tilt or position of the display area of the electronic device.

According to an example embodiment, a method performed in an augmented reality device may include: acquiring a first image including a pattern of light emitted from an electronic device, receiving information about the pattern from the electronic device, identifying at least one among a tilt or a position of a display area of the electronic device based on the first image and information about the pattern, and displaying a virtual object based on at least one among the tilt or position of the display area of the electronic device.

An electronic device according to an example embodiment may include: a communication circuit and at least one processor, wherein the at least one processor is configured to control the electronic device to emit light having a first pattern and transmit information about the first pattern to an augmented reality device via the communication circuit, wherein the information about the first pattern is used to identify at least one among a tilt or a position of a display area of the electronic device in the augmented reality device.

According to various example embodiments, an augmented reality device and an electronic device interacting with an augmented reality device may be provided. An augmented reality device according to an embodiment may receive information about a pattern of light from an electronic device which emits light of a designated pattern, and based on the image acquired via a camera of the augmented reality device and information about a pattern of the received light, may identify at least one among the tilt or position of a display area of the electronic device. An augmented reality device according to various example embodiments may display a virtual object based on at least one among the tilt or position of the display area of the electronic device, and may thus display a virtual object having an appropriate position or tilt, and even though a plurality of electronic devices exist in an image acquired by a camera, the augmented reality device may determine around which electronic device the virtual object is to be displayed.

DETAILED DESCRIPTION

Figure 2:
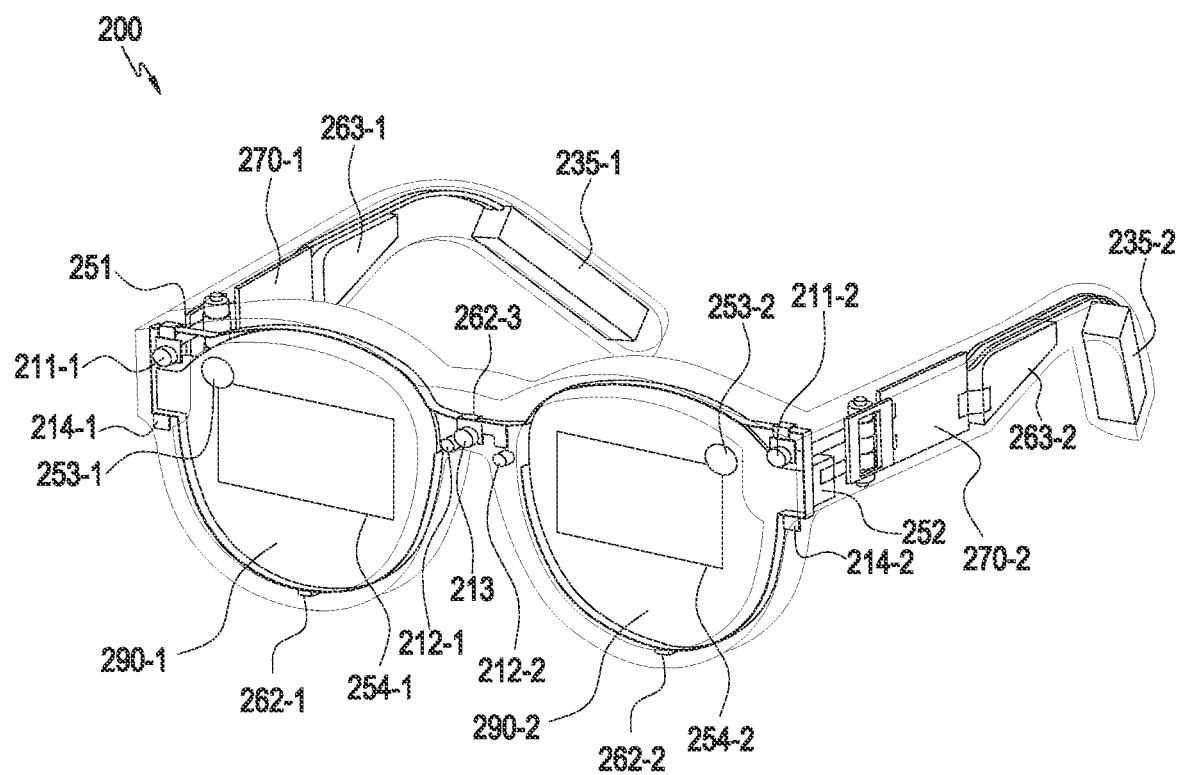
FIG. 2 is a perspective view illustrating an example configuration of an augmented reality device, according to various embodiments.

FIG. 2 is a perspective view illustrating an example configuration of an augmented reality device, according to various embodiments. According to various embodiments, an augmented reality device 200 may include one or more first cameras 211-1 and 211-2, one or more second cameras 212-1 and 212-2, and one or more third cameras 213. According to various embodiments, images obtained via the one or more first cameras 211-1 and 211-2 may be used for detecting a user's hand gesture, head tracking of the user, and/or spatial recognition. According to various embodiments, the one or more first cameras 211-1 and 211-2 may be global shutter (GS) cameras. According to various embodiments, the one or more first cameras 211-1 and 211-2 may perform simultaneous localization and mapping (SLAM) calculation via depth imaging. According to various embodiments, the one or more first cameras 211-1 and 211-2 may perform spatial recognition for 6 DoF (degrees of freedom).

According to various embodiments, images obtained via the one or more second cameras 212-1 and 212-2 may be used to detect and track the pupils of a user. According to various embodiments, the one or more second cameras 212-1 and 212-2 may be GS cameras. According to various embodiments, the one or more second cameras 212-1 and 212-2 may correspond to the left eye and the right eye, respectively, and the performance of the one or more second cameras 212-1 and 212-2 may be the same.

According to various embodiments, the one or more third cameras 213 may be high resolution cameras. According to various embodiments, the one or more third cameras 213 may perform an auto-focusing (AF) function and an image stabilization function. According to various embodiments, the one or more third cameras 213 may be a GS camera or a rolling shutter (RS) camera.

According to various embodiments, the augmented reality device 200 may include one or more light emitting elements 214-1 and 214-2. The light emitting elements 214-1 and 214-2 are different from a light source to be described later, which emits light to a screen output area of a display. According to various embodiments, the light emitting elements 214-1 and 214-2 may emit light to easily detect the pupils in detecting and tracking the pupils of the user via the one or more second cameras 212-1 and 212-2. According to various embodiments, the light emitting elements 214-1 and 214-2 may include LEDs, respectively. According to various embodiments, the light emitting elements 214-1 and 214-2 may emit light in an infrared area. According to various embodiments, the light emitting elements 214-1 and 214-2 may be attached around the frame of the augmented reality device 200. According to various embodiments, the light emitting elements 214-1 and 214-2 may be located around the one or more first cameras 211-1 and 211-2, and may assist gesture detection, head tracking, and spatial recognition by the one or more first cameras 211-1 and 211-2 when the augmented reality device 200 is used in a dark environment. According to various embodiments, the light emitting elements 214-1 and 214-2 may be located around the one or more third cameras 213, and may assist image acquisition by the one or more third cameras 213 when the augmented reality device 200 is used in a dark environment.

According to various embodiments, the augmented reality device 200 may include batteries 235-1 and 235-2. The batteries 235-1 and 235-2 may store electric power for operating the remaining elements of the augmented reality device 200.

According to various embodiments, the augmented reality device 200 may include a first display 251, a second display 252, one or more input optical members 253-1 and 253-2, one or more transparent members 290-1 and 290-2, and one or more screen display portions 254-1 and 254-2. According to various embodiments, the first display 251 and the second display 252 may include, for example, a liquid crystal display (LCD) device, a digital mirror display (DMD) device, or a silicon liquid crystal display (liquid crystal on silicon (LCoS)) device, an organic light emitting diode (OLED), or a micro light emitting diode (micro LED). According to various embodiments, when the first display 251 and the second display 252 are formed of one among a liquid crystal display device, a digital mirror display device, and a silicon liquid crystal display device, the augmented reality device 200 may include a light source which emits light to the screen output area of the display. According to various other embodiments, when the first display 251 and the second display 252 is capable of producing light by themselves, for example, when the first display and the second display are made of one among an organic light emitting diode or a micro LED, the augmented reality device 200 may provide a virtual image of good quality to a user without a separate light source.

According to various embodiments, the one or more transparent members 290-1 and 290-2 may be disposed to face the user's eyes when the user wears the augmented reality device 200. According to various embodiments, the one or more transparent members 290-1 and 290-2 may include at least one among a glass plate, a plastic plate, or a polymer. According to various embodiments, a user may see the outside world via the one or more transparent members 290-1 and 290-2 when wearing the augmented reality device 200. According to various embodiments, the one or more input optical members 253-1 and 253-2 may guide the light produced by the first display 251 and the second display 252 to the eyes of the user. According to various embodiments, an image based on the light produced by the first display 251 and the second display 252 is formed on the one or more screen display portions 254-1 and 254-2 on the one or more transparent members 290-1 and 290-2, and the user may see the image formed on the one or more screen display portions 254-1 and 254-2. In the disclosure, displaying an object on the first display 251 and the second display 252 of the augmented reality device 200 may indicate that an image based on the light produced by the first display 251 and the second display 252 is formed on the one ore more screen display portions 254-1 and 254-2 on the one or more transparent members 290-1 and 290-2.

According to various embodiments, the augmented reality device 200 may include one or more optical waveguides (not shown). The optical waveguide may deliver the light produced by the first display 251 and the second display 252 to the user's eyes. The augmented reality device 200 may include two optical waveguides corresponding to the left eye and the right eye, respectively. According to various embodiments, the optical waveguide may include at least one among glass, plastic, or polymer. According to various embodiments, the optical waveguide may include a nanopattern formed on an inner or outer surface, for example, a polygonal or curved grating structure. According to various embodiments, the optical waveguide may include a freeform prism, and the optical waveguide may provide incident light to a user via a reflection mirror. According to various embodiments, the optical waveguide may include at least one of at least one diffractive element (e.g., a diffuse optical element (DOE) or a holographic optical element (HOE)) or a reflective element (e.g., a reflective mirror), and may guide display light emitted from a light source to the eyes of a user using at least one diffractive element or reflective element included in the optical waveguide. According to various embodiments, the diffractive element may include an input/output optical member. According to various embodiments, the reflective element may include a member which causes total reflection.

According to various embodiments, the augmented reality device 200 may include one or more voice input devices 262-1, 262-2, and 262-3, and one or more voice output devices 263-1 and 263-2.

According to various embodiments, the augmented reality device 200 may include a first PCB 270-1 and the second PCB 270-2. The first PCB 270-1 and the second PCB 270-2 may transmit electrical signals to components included in the augmented reality device 200, such as a first camera 311, a second camera 312, a third camera 313, a display module 350, an audio module 361, and a sensor 380, which will be described later with reference to FIG. 3. According to various embodiments, the first PCB 270-1 and the second PCB 270-2 may be FPCBs. According to various embodiments, the first PCB 270-1 and the second PCB 270-2 may each include a first substrate, a second substrate, and an interposer disposed between the first substrate and the second substrate.

Figure 3:
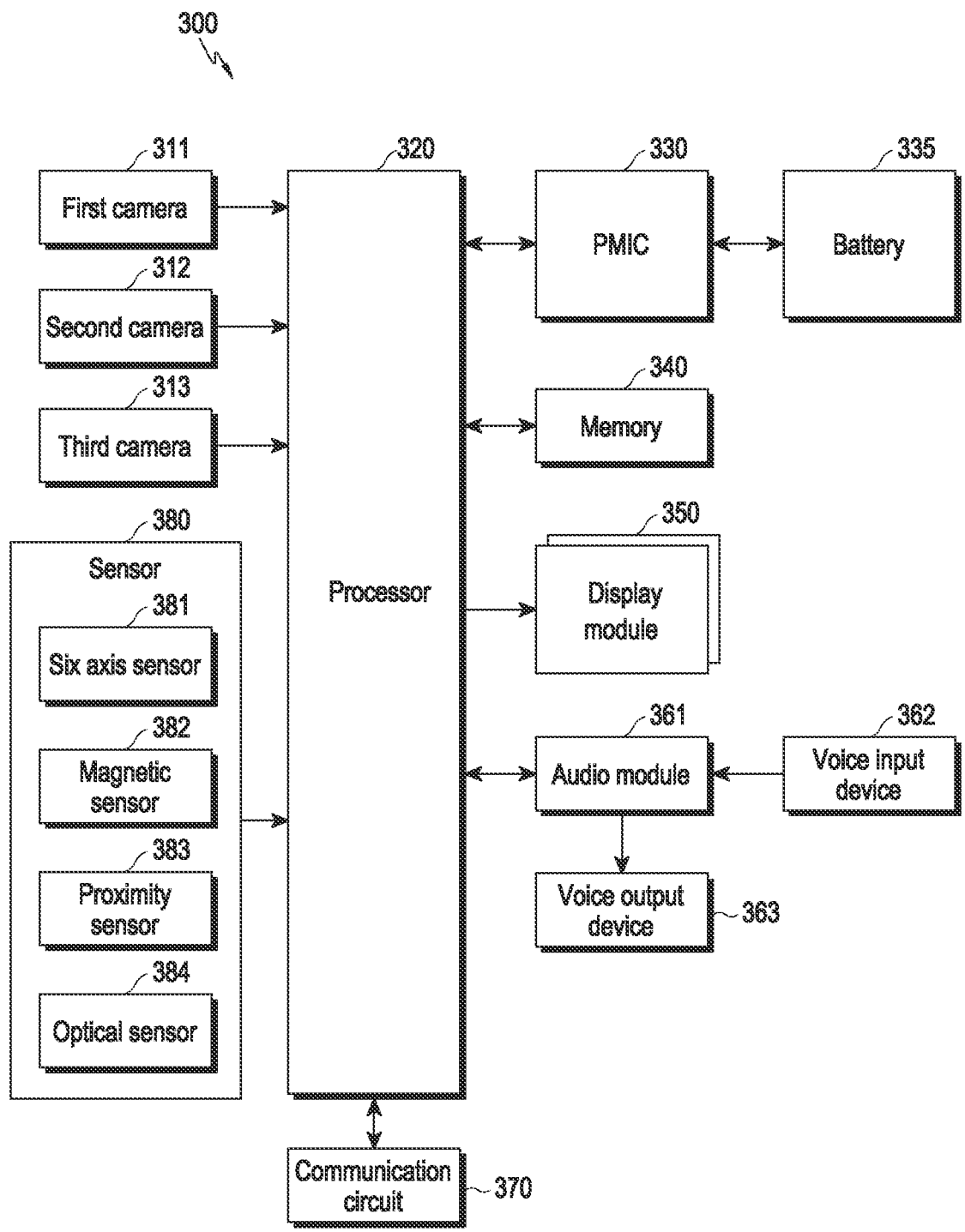
FIG. 3 is a block diagram illustrating an example configuration of an augmented reality device, according to various embodiments.

FIG. 3 is a block diagram illustrating an example configuration of an augmented reality device, according to various embodiments. An augmented reality device 300 may include a first camera 311, a second camera 312, a third camera 313, a processor (e.g., including various processing circuitry) 320, a PMIC (e.g., power management integrated circuit) 330, a battery 335, a memory 340, a display module (e.g., including a display) 350, an audio module (e.g., including audio circuitry) 361, a voice input device (e.g., including voice input circuitry) 362, a voice output device (e.g., including voice output circuitry) 363, a communication circuit 370, and a sensor 380.

According to various embodiments, the details of the one or more first cameras 211-1 and 211-2, the one or more second cameras 212-1 and 212-2, and the one or more third cameras 213 described above with reference to FIG. 2 may be equally applied to the first camera 311, the second camera 312, and the third camera 313, respectively. According to various embodiments, the augmented reality device 300 may include at least one type of multiple cameras among the first camera 311, the second camera 312, and the third camera 313.

According to various embodiments, the processor 320 may include various processing circuitry (as used herein, including the claims, the term "processor" may include various processing circuitry, including at least one processor, wherein one or more processors of the at least one processor may be configured to perform the various functions described herein) and control other elements of the augmented reality device 300, for example, the first camera 311, the second camera 312, the third camera 313, the PMIC 330, the memory 340, the display module 350, the audio module 361, the communication circuit 370, and the sensor 380, and may perform data processing or operations.

According to various embodiments, the PMIC 330 may include a power management integrated circuit and convert power stored in the battery 335 to have a current or voltage required by other elements of the augmented reality device 300 to supply same to other elements of the augmented reality device 300.

According to various embodiments, the memory 340 may store various data used by at least one element (e.g., the processor 320 or the sensor 380) of the augmented reality device 300.

According to various embodiments, the display module 350 may include a display and display a screen to be provided to a user. According to various embodiments, the display module 350 may include the first display 251, the second display 252, the one or more input optical members 253-1 and 253-2, the one or more transparent members 290-1 and 290-2, and the one or more screen display portions 254-1 and 254-2 described above with reference to FIG. 2.

According to various embodiments, the audio module 361 may include various circuitry and be connected to the voice input device 362 and the voice output device 363 to convert data input via the voice input deice 362 and convert data to be output to the voice output device 363. The voice output device 363 may include a speaker and an amplifier.

According to various embodiments, the communication circuit 370 may support establishment of a wireless communication channel with an electronic device outside the augmented reality device 300 and communication via the established communication channel According to various embodiments, the communication circuit 370 may support at least one among Bluetooth low energy (BLE), near field communication (NFC), and wireless fidelity (WiFi) communication.

According to various embodiments, the communication circuit 370 may support wired communication with an electronic device outside the augmented reality device 300.

According to various embodiments, the sensor 380 may include, for example, and without limitation, a 6-axis sensor 381, a magnetic sensor 382, a proximity sensor 383, and/or an optical sensor 384.

Figure 4:
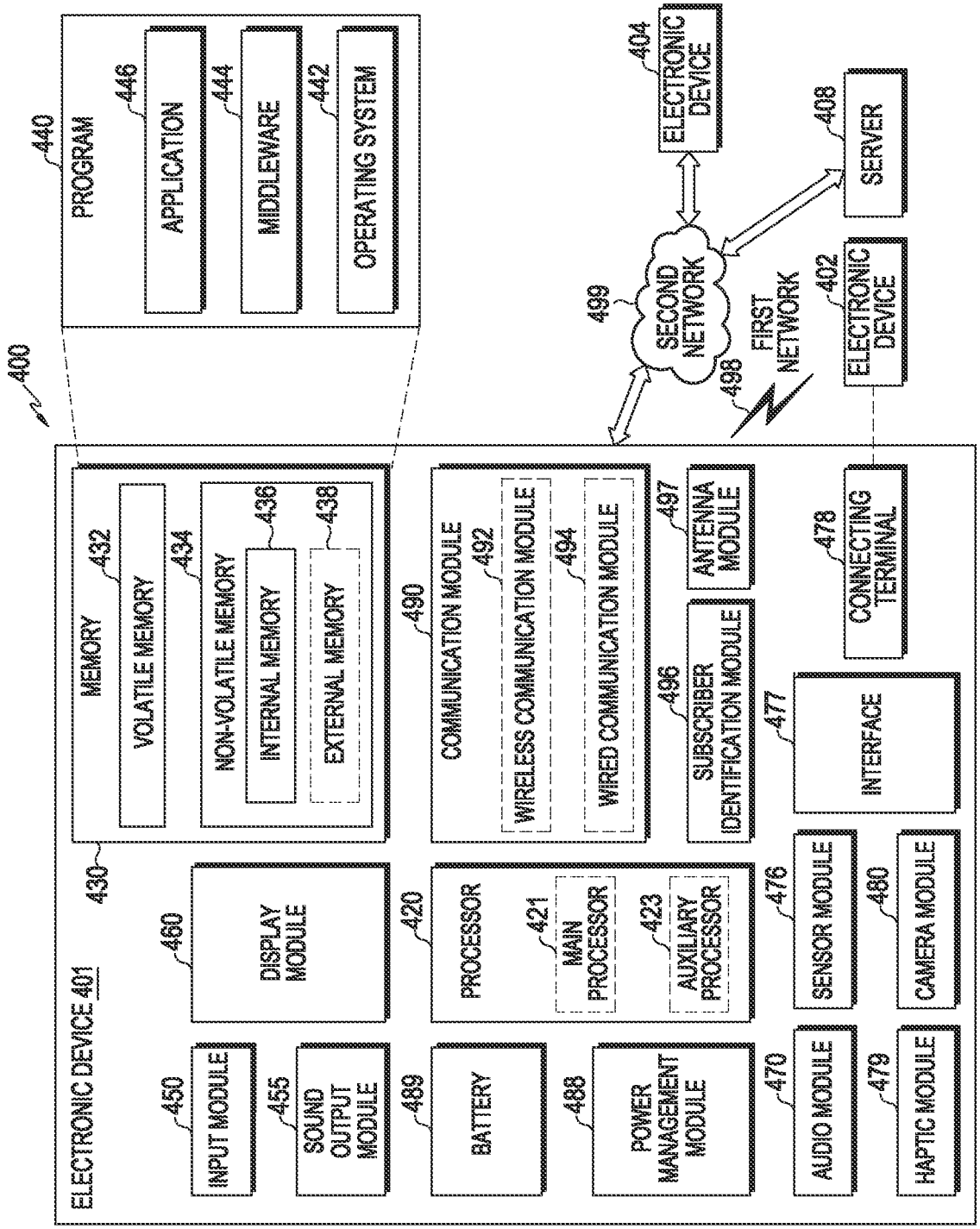
FIG. 4 is a block diagram illustrating an example electronic device in a network environment, according to various embodiments.

FIG. 4 is a block diagram illustrating an example electronic device 401 in a network environment 400 according to various embodiments. Referring to FIG. 4, the electronic device 401 in the network environment 400 may communicate with an electronic device 402 via a first network 498 (e.g., a short-range wireless communication network), or at least one of an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In various embodiments, at least one of the components (e.g., the connecting terminal 478) may be omitted from the electronic device 401, or one or more other components may be added in the electronic device 401. In various embodiments, some of the components (e.g., the sensor module 476, the camera module 480, or the antenna module 497) may be implemented as a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to an embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the electronic device 401 includes the main processor 421 and the auxiliary processor 423, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423. According to an embodiment, the auxiliary processor 423 (e.g., the neural processing unit) may include a hardware structure specified for artificial intelligence model processing. An artificial intelligence model may be generated by machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by another component (e.g., the processor 420) of the electronic device 401, from the outside (e.g., a user) of the electronic device 401. The input module 450 may include, for example, a microphone, a mouse, a keyboard, a key (e.g., a button), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 401. The display module 460 may include, for example, a display, a hologram device, or a projector and control circuitry to control a corresponding one of the display, hologram device, and projector. According to an embodiment, the display module 460 may include a touch sensor adapted to detect a touch, or a pressure sensor adapted to measure the intensity of force incurred by the touch.

The audio module 470 may convert a sound into an electrical signal and vice versa. According to an embodiment, the audio module 470 may obtain the sound via the input module 450, or output the sound via the sound output module 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to an embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via the first network 498 (e.g., a short-range communication network, such as Bluetooth™, wireless-fidelity (Wi-Fi) direct, or infrared data association (IrDA)) or the second network 499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device) of the electronic device 401. According to an embodiment, the antenna module 497 may include an antenna including a radiating element including a conductive material or a conductive pattern formed in or on a substrate (e.g., a printed circuit board (PCB)). According to an embodiment, the antenna module 497 may include a plurality of antennas (e.g., array antennas). In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 or 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In an embodiment, the external electronic device 404 may include an internet-of-things (IoT) device. The server 408 may be an intelligent server using machine learning and/or a neural network. According to an embodiment, the external electronic device 404 or the server 408 may be included in the second network 499. The electronic device 401 may be applied to intelligent services (e.g., smart home, smart city, smart car, or healthcare) based on 5G communication technology or IoT-related technology.

Figure 5:
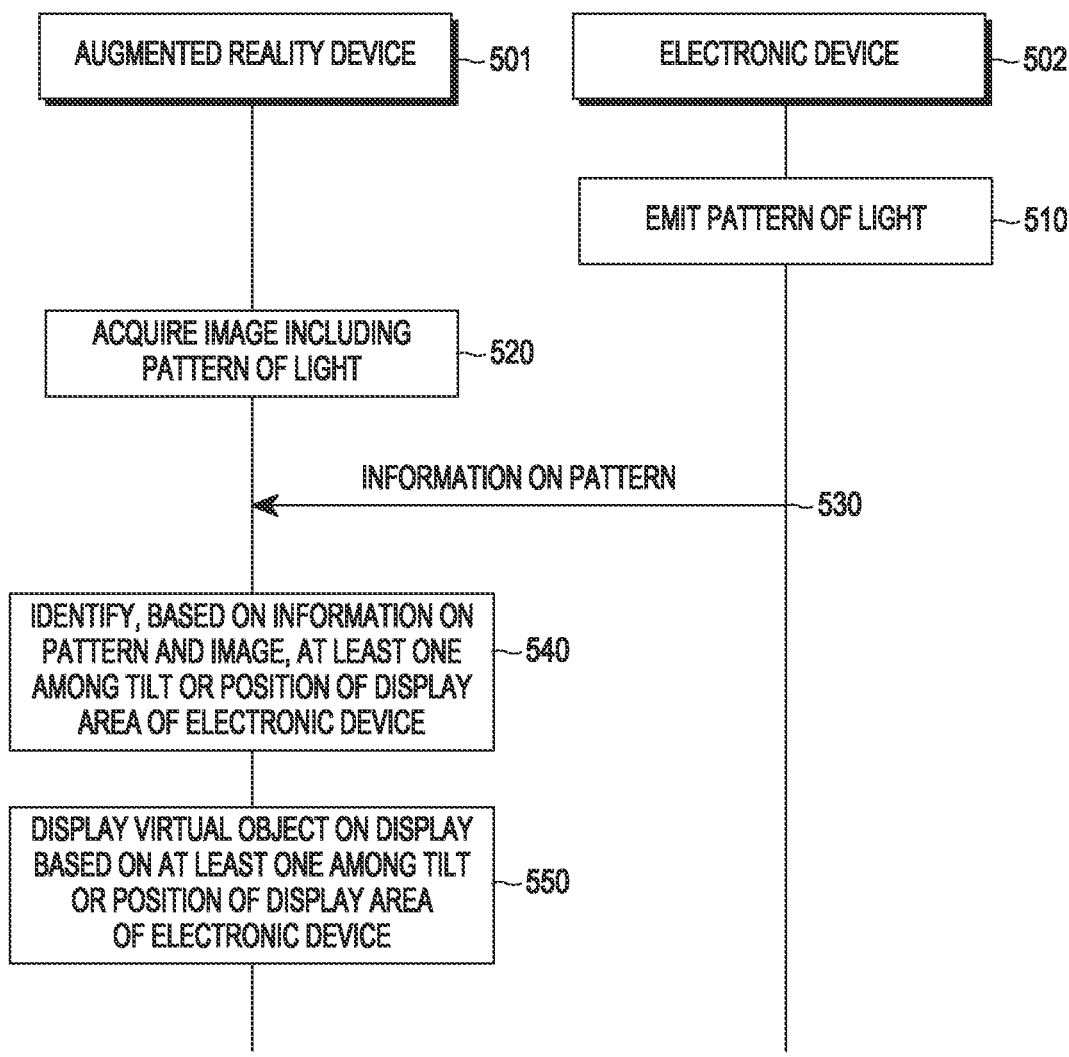
FIG. 5 is a signal flow diagram illustrating example operations of an augmented reality device and an electronic device, according to various embodiments.

FIG. 5 is a signal flow diagram illustrating example operations of an augmented reality device and an electronic device, according to various embodiments.

An electronic device 502 (e.g., the processor 420 of the electronic device 401) may emit light having a designated pattern in operation 510. According to various embodiments, the electronic device 502 may control a display 460 to visually display a pattern on a display area of a display (e.g., the display module 460). The display area may refer to an area in which a screen is displayed on the display 460.

Figure 6:
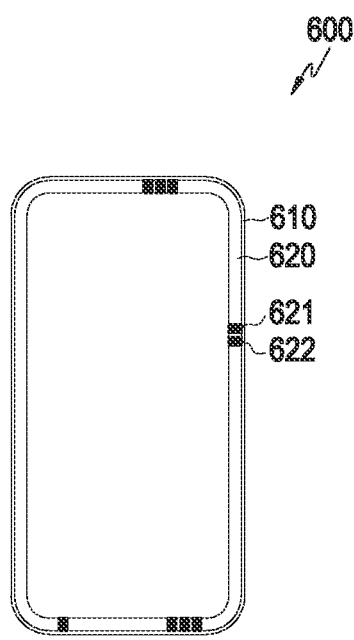
FIG. 6 is a diagram illustrating an example of a pattern of light displayed in an electronic device, according to various embodiments.

An example of the display 460 for visually displaying a pattern is shown in FIG. 6. Referring to FIG. 6, the pattern displayed on the display area 600 of the display may include a first portion 610 displayed on the edge of the display area 600. According to various embodiments, a pattern displayed on the display area 600 of the display may include a second portion 620 including a plurality of elements 621 and 622. According to various embodiments, unlike that shown in FIG. 6, the pattern may be displayed on an inner area of the display area 600 instead of the edge of the display area 600.

Figures 7A, 7B:
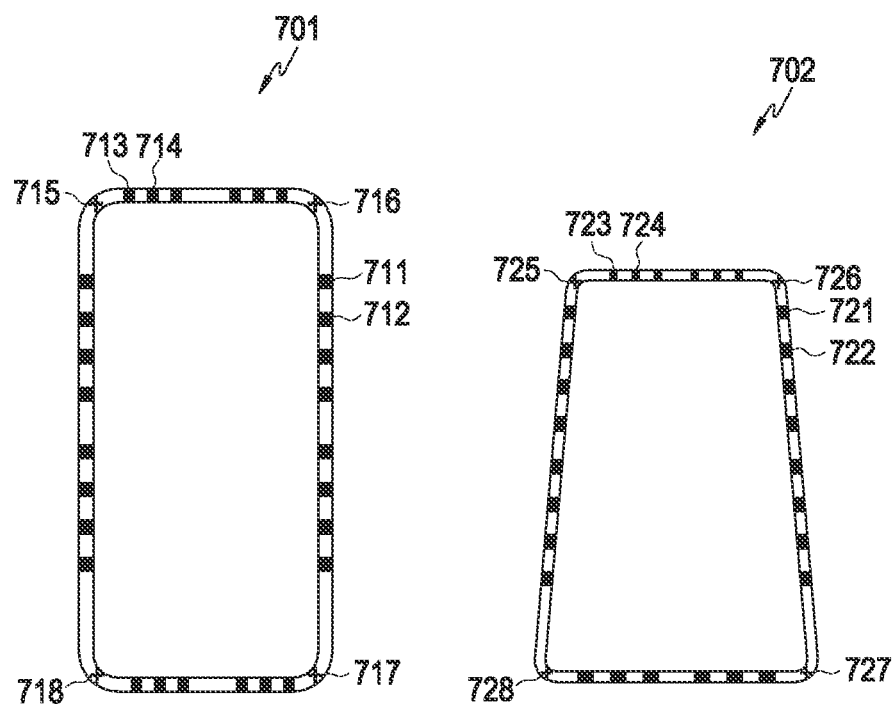
FIGS. 7A and 7B are diagrams illustrating an example of a pattern of light displayed in an electronic device and an electronic device in an image acquired in an augmented reality device, according to various embodiments.

Another example of the display 460 for visually displaying a pattern is shown in FIGS. 7A and 7B. FIG. 7A is a diagram illustrating an example of the display 460 for displaying a pattern according to various embodiments. Referring to FIG. 7A, the pattern displayed on the display area 701 of the display may be displayed on the edge of the display area 701. According to various embodiments, the pattern may include vertex elements 715, 716, 717, and 718 displayed at vertex positions. The vertex elements 715, 716, 717, and 718 may represent the shape of the display area 701 and the positions of vertices of the display area 701. According to various embodiments, a pattern may include a plurality of segment elements 711, 712, 713, and 714. The number and size of the segment elements 711, 712, 713, and 714, and the positions of the segment elements 711, 712, 713, and 714 in the display area 701 may be uniquely formed in the electronic device 502, and thus an augmented reality device 501 may be used to identify the electronic device 502.

Figure 8:
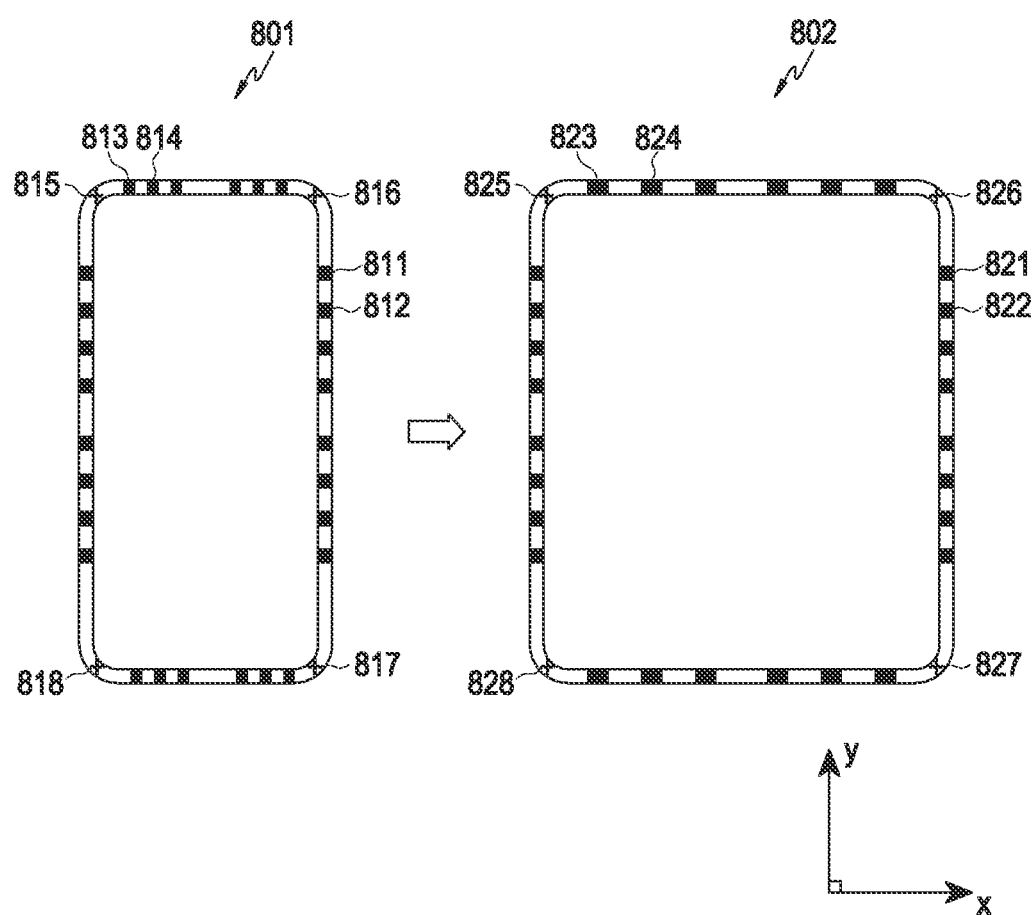
FIG. 8 is a diagram illustrating an example of a pattern of light displayed in an electronic device, according to various embodiments.

Another example of the display 460 for visually displaying a pattern is shown in FIG. 8. Referring to FIG. 8, while a pattern is displayed on a display area 801 of a display, the electronic device may be expanded in the x direction, and thus the display area may be expanded in the x direction. An expanded display area 802 may have a larger width in the x direction than the display area 801. According to various embodiments, when the display 460 of the electronic device is a foldable, rollable, or slidable display, the electronic device may be expanded.

With respect to elements 811, 812, 813, 814, 815, 816, 817, and 818 of a pattern displayed on the display area 801, details are equally applied with reference to FIG. 7A. Referring to FIG. 8, a pattern displayed in the expanded display area 802 may include vertex elements 825, 826, 827, and 828. The vertex elements 825, 826, 827, and 828 may indicate a shape of the expanded display area 802 and positions of vertices of the expanded display area 802. According to various embodiments, the pattern displayed on the expanded display area 802 may include a plurality of segment elements 821, 822, 823, and 824. According to various embodiments, the length of the segment elements 823 and 824 and the gap between the segment elements 823 and 824 extending in the x direction may be longer than the length of the segment elements 813 and 814 and the gap between the segment elements 813 and 814 displayed on the display area 801. In FIG. 8, the elements of a pattern displayed on the expanded display area 802 have a shape in which the elements displayed on the display area 801 are extended in the x direction. However, according to various embodiments, a pattern displayed on the expanded display area 802 may be completely different from the pattern displayed on the display area 801.

According to various embodiments, when the electronic device 502 visually displays a pattern on the display 460, the electronic device 502 may display a pattern periodically at a designated frequency instead of always displaying a pattern on the display 460. For example, the display 460 may have a frame rate of 60 fps, and the electronic device 502 may display a pattern in one frame in every 15 frames and may not display a pattern in the remaining frames. In another example, the display 460 may have a frame rate of 60 fps, and the electronic device 502 may display a pattern in one frame in every 30 frames and may not display the pattern in the remaining frames. According to various embodiments, when the frame rate of the display 460 is higher, the number of consecutive frames in which the pattern is displayed may be proportionally higher. For example, the display 460 may dynamically support various frame rates such as 60 fps, 90 fps, 120 fps, and 144 fps. When the display 460 is operating at a frame rate of 60 fps, the pattern may be displayed in one frame in every 15 frames, and when the display 460 is operating at a frame rate of 120 fps, the pattern may be displayed in two consecutive frames in every 30 frames. In both cases, the frequency at which the pattern is displayed may be equal to 4 times per second. By displaying a pattern only for a short period of time which is not recognized by a user instead of always displaying the pattern, the electronic device 502 may alleviate a user's discomfort caused by the reduction of the area on the display 460 where the content will be displayed due to the display of the pattern.

Figure 9:
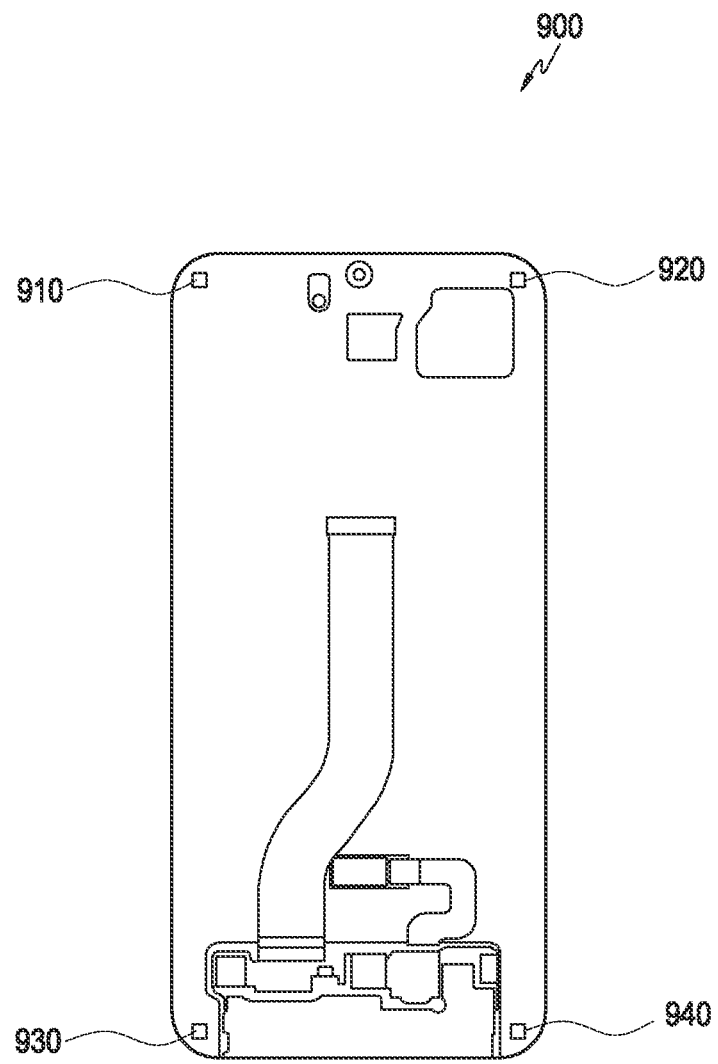
FIG. 9 is a diagram illustrating an example of an electronic device, according to various embodiments.

According to various embodiments, the electronic device 502 may include an infrared sensor, and in operation 510 may emit light of an infrared area via the infrared sensor. An example of an electronic device including infrared sensors is shown in FIG. 9. FIG. 9 is a diagram illustrating an example of a rear surface of an electronic device, according to various embodiments. Referring to FIG. 9, an electronic device 900 may include infrared sensors 910, 920, 930, and 940 at positions corresponding to vertices of a display area of a display. The infrared sensors 910, 920, 930, and 940 are point light sources, but the time-sequential changes in the intensity of light emitted from the infrared sensors 910, 920, 930, and 940 may form a pattern. The light pattern may represent information about the size and shape of the display area of the display and/or a unique pattern of the electronic device 502 for identifying the electronic device 502.

According to various embodiments, a pattern of light emitted in operation 510 may be configured by a user's input. For example, when a light pattern is visually displayed, visual characteristics of at least one element of the pattern, for example, the size, color, shape, and spacing between elements may be configured by a user's input.

In operation 520, the augmented reality device 501 (e.g., the processor 320 of the augmented reality device 300) may acquire an image including a light pattern via at least one camera (e.g., the first camera 311). An example of an image obtained from the augmented reality device 501 is shown in FIG. 7. FIG. 7B is a diagram illustrating a portion corresponding to the display area shown in FIG. 7A among images obtained from an augmented reality device according to various embodiments. Since at least one camera 311 of the augmented reality device 501 does not always look straight at the display area of the electronic device 502, as shown in FIG. 7B, the pattern included in the image of the display area 702 included in the acquired image may be inclined compared to the pattern shown in FIG. 7A. The pattern included in the acquired image may include vertex elements 725, 726, 727, and 728 corresponding to the vertex elements 715, 716, 717, and 718 and segment elements 721, 722, 723, and 724 corresponding to the segment elements 711, 712, 713, and 714.

According to various embodiments, the augmented reality device 501 may receive information about the frequency and/or duration of displaying a pattern on the display device of the electronic device 502 from the electronic device 502, and based on the received information, may control the frame rate at which the at least one camera 311 acquire images. For example, the augmented reality device 501 may receive, from the electronic device 502, information that the display 460 of the electronic device 502 has a frame rate of 60 fps, a pattern is displayed in 4 consecutive frames among 60 frames displayed for 1 second, and the pattern is not displayed in the remaining 56 frames. The augmented reality device 501 may obtain an image by controlling the at least one camera 311 at a frame rate of 15 fps based on the received information.

In another example, the augmented reality device 501 may receive, from the electronic device 502, information that the display 460 of the electronic device 502 has a frame rate of 60 fps, a pattern is displayed in two consecutive frames out of 60 frames displayed for 1 second, and the pattern is not displayed in the remaining 58 frames. The augmented reality device 501 may obtain an image by controlling the at least one camera 311 at a frame rate of 30 fps based on the received information.

According to various embodiments, as will be described in greater detail below with reference to FIG. 10, the augmented reality device 501 may initially control the at least one camera 311 to acquire an image at a maximum frame rate, then receive information about the frequency and/or duration of displaying a pattern on the display device of the electronic device 502 from the electronic device 502, and based on the received information, control the frame rate at which the at least one camera 311 acquires images.

In operation 530, the augmented reality device 501 may receive information about a pattern of light from the electronic device 502 via a communication circuit (e.g., the communication module 490).

According to various embodiments, when a pattern of light is visually displayed on the display area of the display 460 as shown in FIGS. 6 and 7A, the information on the pattern of light may indicate positions on the display area in which portions included in the pattern (e.g., the first portion 610 and the second portion 620) are displayed and/or sizes of the portions. For example, the information on the pattern of light may indicate the fact that the first portion 610 included in the pattern is displayed along the edge of the display area, and the length and width of bands configuring the first portion 610. According to various embodiments, when the pattern is not displayed at the edge of the display area, information about the pattern of light may include information about a relative position between the pattern and the edge of the display area. For example, the information on the pattern of light may indicate that the center of the pattern is the same as the center of the display area, and the length of each side configuring the pattern is half of the length of each side of the edge of the display area.

According to various embodiments, when the electronic device 502 displays a pattern shown in FIG. 7A, information on a pattern of light may represent the fact that the vertex elements 715, 716, 717, and 718 included in the pattern correspond to the vertex positions of the display area, the sizes of the segment elements 711, 712, 713, and 714, the distances between the segment elements 711, 712, 713, and 714, and/or the positions of the segment elements 711, 712, 713, and 714.

According to various embodiments, as an example shown in FIG. 8, when different patterns are displayed before and after the expansion of the electronic device, the electronic device 502 may transmit information about the pattern displayed on the display area 801 to the augmented reality device 501 while displaying the pattern on the display area 801 before expansion, and after expansion, the electronic device 502 may transmit information about the pattern displayed in the expanded display area 802 to the augmented reality device 501. After the electronic device 502 is expanded, information about the pattern displayed in the expanded display area 802 may be transmitted to the augmented reality device 501, and thus the augmented reality device 501 may update information about the display area, which has been changed as the electronic device 502 is expanded. Therefore, even though the electronic device is expanded, the augmented reality device 501 may display a virtual object at an appropriate position.

According to various embodiments, as an example shown in FIG. 9, when the time-sequential change in the intensity of light in the infrared area emitted from each of the infrared sensors 910, 920, 930, and 940 of the electronic device 900 forms a pattern, the information on the pattern may represent information about the time-sequential pattern of the intensity of light in the infrared area emitted from each of the infrared sensors 910, 920, 930, and 940 and/or a relationship between the locations of the infrared sensors 910, 920, 930, and 940 and display areas of a display of the electronic device 900.

In operation 540, the augmented reality device 501 may identify at least one of a position or a tilt of a display area of the electronic device 502, based on information about a pattern of light received from the electronic device 502 and an image obtained in operation 520.

Referring to FIGS. 7A and 7B again, based on the information received in operation 530, the augmented reality device 501 may identify, in the image acquired in operation 520, that the vertex elements 725, 726, 727, and 728 correspond to the vertex elements 715, 716, 717, and 718, respectively, and the segment elements 721, 722, 723, and 724 correspond to the segment elements 711, 712, 713, and 714, respectively. The augmented reality device 501 may identify at least one among a position or tilt of the display area of the electronic device 502, based on at least one among the positions and sizes of the vertex elements 715, 716, 717, and 718, the positions and sizes of the segment elements 721, 722, 723, and 724, the gap between the segment elements 721 and 722, or the gap between the segment elements 723 and 724. According to various embodiments, the position of the display area of the electronic device 502 may indicate the position of the display area of the electronic device 502 within the image acquired in operation 520 or the view of the at least one camera 311 of the augmented reality device 501. According to various embodiments, the tilt of the display area of the electronic device 502 may indicate the tilt in a three-dimensional space of a plane corresponding to the display area of the electronic device 502 within the image acquired in operation 520 or the view of the at least one camera 311 of the augmented reality device 501.

In operation 550, the augmented reality device 501 may display a virtual object on a display (e.g., the display module 350), based on at least one of the position or tilt of the display area of the electronic device 502, which has been confirmed in operation 540.

According to various embodiments, the augmented reality device 501 may identify the position of the display area of the electronic device 502 in operation 540 and display a virtual object at a position separated by a designated distance from the identified position in a designated direction.

According to various embodiments, the augmented reality device 501 may identify the tilt of the display area of the electronic device 502 in operation 540 and display the virtual object in the form of a plane parallel to the display area. According to various embodiments, in operation 540, the augmented reality device 501 may identify the tilt of the display area of the electronic device 502 and display a virtual object tilted by a designated angle relative to the display area.

According to various embodiments, the virtual object may represent information that may be displayed without providing content information from the electronic device 502, such as current time and/or weather information.

Figure 1A:
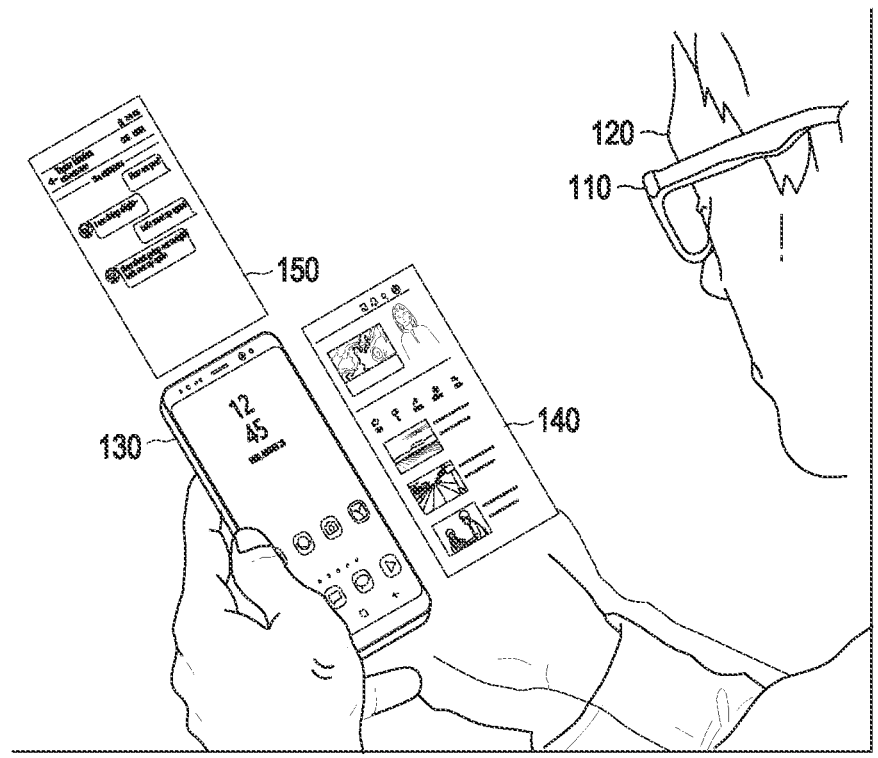
FIG. 1A is a diagram illustrating an example virtual object display by an augmented reality device according to various embodiments.
Figure 1B:
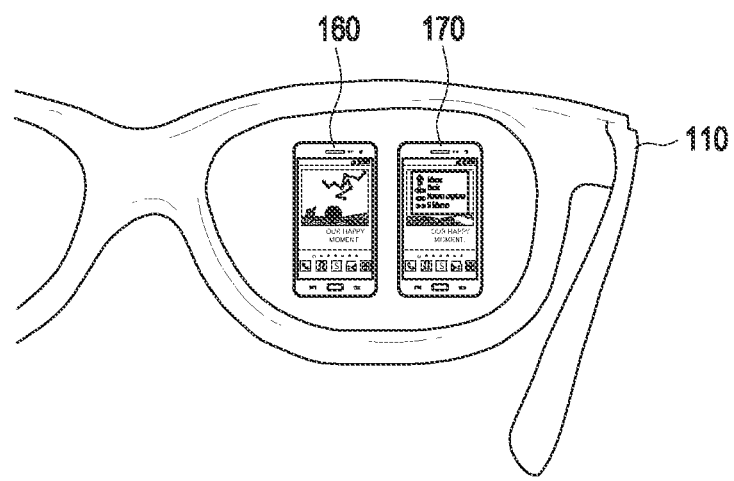
FIG. 1B is a diagram illustrating an example in which a plurality of electronic devices is located within the FOV of a user wearing an augmented reality device.

According to various embodiments, before performing operation 550, the augmented reality device 501 may receive information about content to be displayed in the form of a virtual object from the electronic device 502, and based on the information about the received content, display the virtual object. According to various embodiments, the virtual object may indicate remaining battery power of the electronic device 502, a username of the electronic device 502, and/or an execution screen of an application running in the background of the electronic device 502 (see virtual objects 140 and 150 in FIG. 1A).

According to various embodiments, operations 510 to 550 of FIG. 5 may be performed based on various trigger conditions. According to various embodiments, a designated user input identified by the augmented reality device 501, for example, a designated gesture or execution of a designated application, may be included in the trigger condition. According to various embodiments, the inclusion of the shape of another electronic device in an image acquired by the at least one camera 311 of the augmented reality device 501 may be included as a trigger condition. According to various embodiments, a designated user input identified by the electronic device 502, for example, a designated gesture or execution of a designated application, may be included in the trigger condition.

Figure 10:
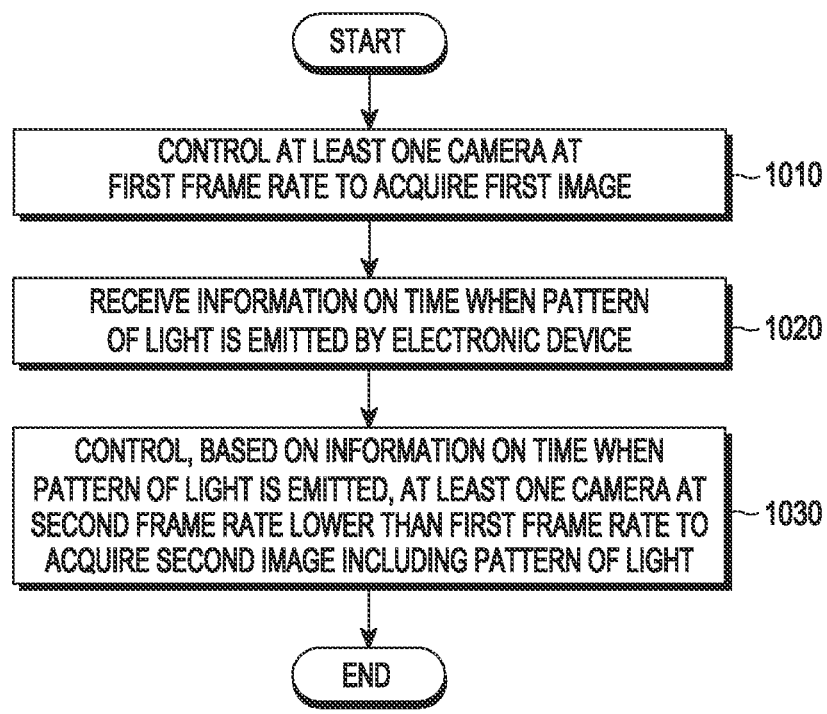
FIG. 10 is a flowchart illustrating example operations of an augmented reality device, according to various embodiments.

FIG. 10 is a flowchart illustrating example operations of controlling the frame rate of a camera for acquiring an image in an augmented reality device (e.g., the processor 320 of the augmented reality device 300), according to various embodiments.

In operation 1010, the at least one processor 320 of the augmented reality device 300 may control the frame rate of at least one camera (e.g., the first camera 311) of the augmented reality device 300 to a first frame rate, and acquire a first image via the at least one camera 311. According to various embodiments, the first frame rate may be the maximum frame rate which the at least one camera 311 may have.

In operation 1020, the at least one processor 320 of the augmented reality device 300 may receive information about the time when the pattern of light is emitted by the electronic device 401, from an electronic device (e.g., the electronic device 401) via the communication circuit (e.g., the communication circuit 370). In operation 1020, the light emitted by the electronic device 401 may be included in a first image. According to various embodiments, information about the time when the pattern of light is emitted may include information regarding the frequency and/or duration at which the patterns of light are displayed. According to various embodiments, the information about the time at which the pattern of light is emitted may include information about the time-sequential pattern of the emitted light.

In operation 1030, based on the information received in operation 1020, the at least one processor 320 of the augmented reality device 300 may control at least one camera at a second frame rate lower than the first frame rate to acquire a second image including the pattern of light. For example, the processor 320 of the augmented reality device 300 may receive information that the display 460 of the electronic device 401 has the frame rate of 60 fps, a pattern is displayed in four consecutive frames among 60 frames displayed for one second, and the pattern is not displayed in the remaining frames in operation 1020, and based on the received information, may control the at least one camera 311 at the frame rate of 15 fps to acquire a second image.

For example, the at least one processor 320 of the augmented reality device 300 may receive information on a time-sequential pattern of lights emitted from infrared sensors of the electronic device 401 in operation 1020, and may control the at least one camera 311 at the lowest frame rate at which a time-sequential pattern of lights may be identified to acquire a second image.

The augmented reality device 300 according to various embodiments may initially control the at least one camera 311 at a high frame rate, and may thus ensure that an image including a pattern of light is obtained to identify the electronic device 401. In addition, the augmented reality device 300 according to various embodiments may control the at least one camera 311 at a second frame rate lower than the first frame rate after receiving information about the time at which the pattern of light is emitted, and may thus reduce power consumption caused by the at least one camera 311.

Figure 11:
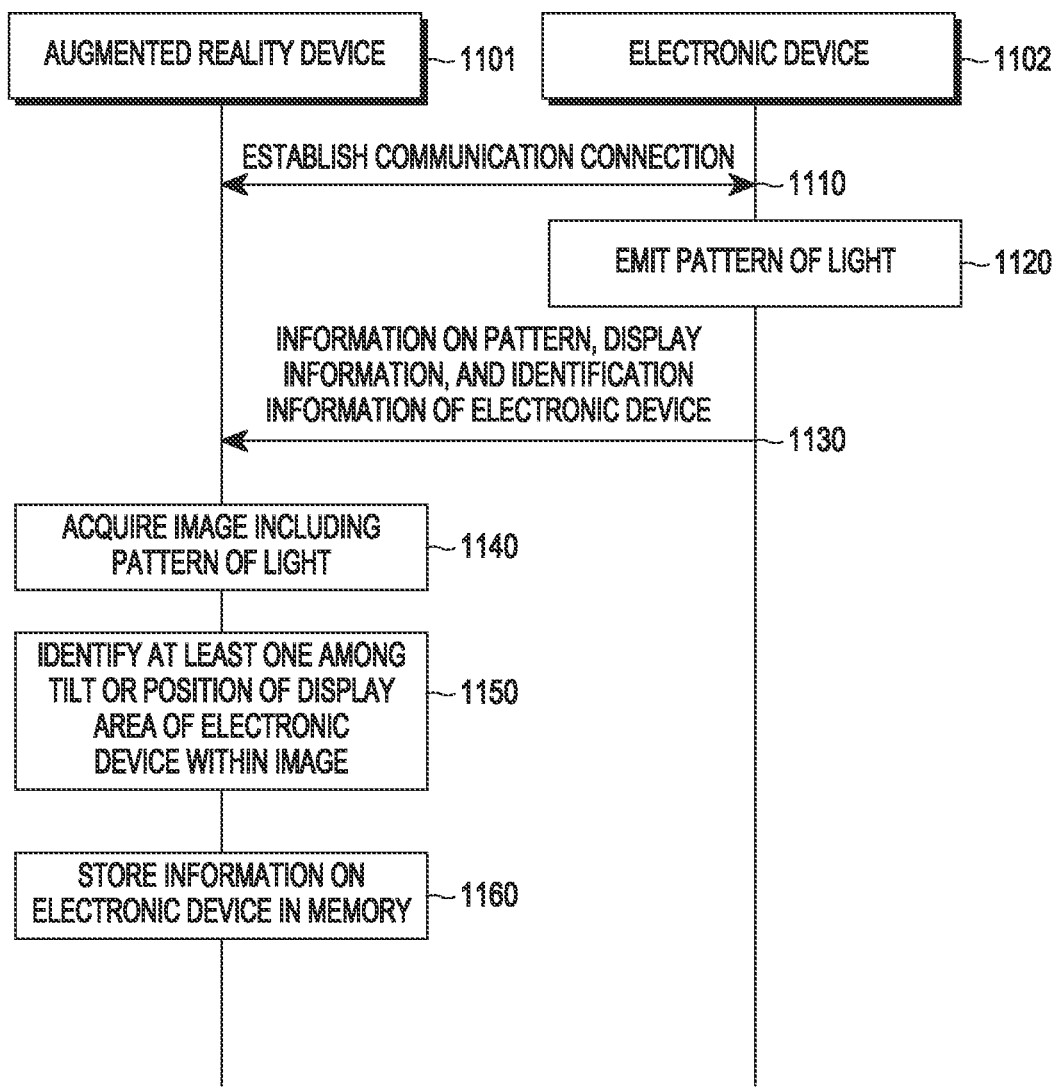
FIG. 11 is a signal flow diagram illustrating example operations of an augmented reality device and an electronic device, according to various embodiments.

FIG. 11 is a signal flow diagram illustrating example operations of an augmented reality device and an electronic device, according to various embodiments.

In operation 1110, an augmented reality device 1101 (e.g., the processor 320 of the augmented reality device 300) may establish a communication connection with a communication circuit (e.g., the communication module 490) of an electronic device 1102 (e.g., the processor 420 of the electronic device 401) via a communication circuit (e.g., the communication circuit 370).

In operation 1120, the electronic device 1102 may emit a pattern of light. As described with reference to operation 510 of FIG. 5, the electronic device 1102 may visually display the pattern of light on a display or emit light in an ultraviolet area having a pattern which changes time-sequentially via an infrared sensor.

In operation 1130, the electronic device 1102 may transmit information on the pattern of light, display information, and identification information of the electronic device 1102 to the augmented reality device 1101 via a communication circuit 490. Details regarding the information on the pattern of light have been described above with reference to operation 530 of FIG. 5. According to various embodiments, the display information may include information about a display included in the electronic device 1102 (e.g., the display module 460). For example, the display information may indicate at least one among a size of a display area of the display 460, a shape of the display area, a resolution of the display 460, a scanning frequency of the display 460, or a frame rate. According to various embodiments, identification information of the electronic device 1102 may indicate a MAC address of the electronic device 1102.

In operation 1140, the augmented reality device 1101 may acquire an image including the pattern of light via at least one camera (e.g., the first camera 311). With respect to operation 1140, details for operation 520 of FIG. 5 may be applied.

In operation 1150, the augmented reality device 1101 may identify at least one among the tilt or position of the display area of the electronic device 1102, within the image acquired in operation 1140. With respect to operation 1150, details for operation 540 of FIG. 5 may be applied.

In operation 1160, the augmented reality device 1101 may store information about the electronic device 1102 in a memory (e.g., the memory 340). According to various embodiments, information about the electronic device 1102 may include at least one among display information, identification information of the electronic device 1102, or a name designated by a user in response to the electronic device 1102.

Figure 12:
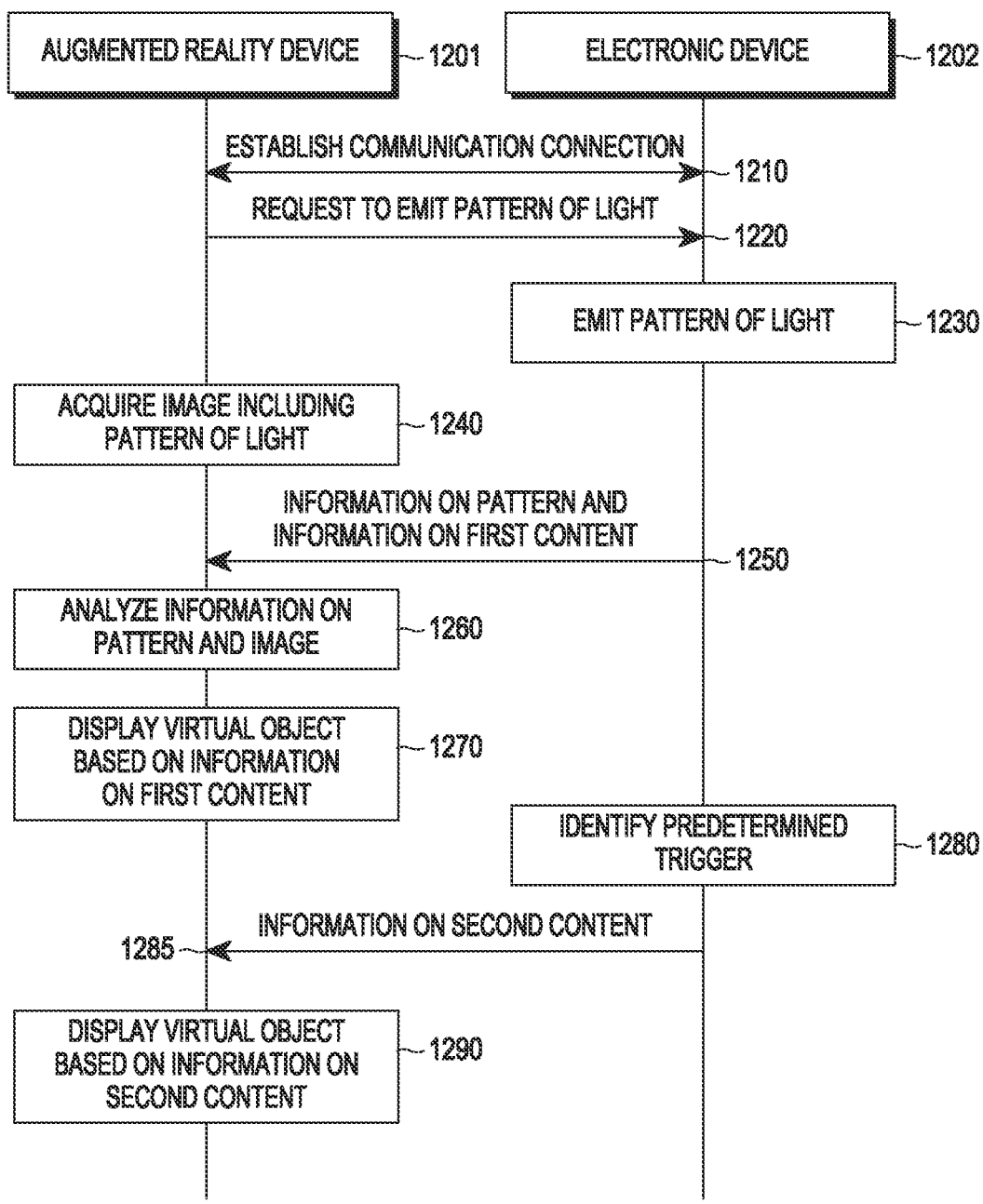
FIG. 12 is a signal flow diagram illustrating example operations of an augmented reality device and an electronic device, according to various embodiments.

FIG. 12 is a signal flow diagram illustrating example operations of an augmented reality device and an electronic device, according to various embodiments.

In operation 1210, an augmented reality device 1201 (e.g., the processor 320 of the augmented reality device 300) may establish a communication connection with a communication circuit (e.g., the communication module 490) of an electronic device 1202 (e.g., the processor 420 of the electronic device 401) via a communication circuit (e.g., the communication circuit 370).

In operation 1220, the augmented reality device 1201 may request the electronic device 1202 to emit the pattern of light. According to various embodiments, the augmented reality device 1201 may perform operation 1220 in response to the identification that the trigger condition described with reference to FIG. 5 is satisfied.

In operation 1230, the electronic device 1202 may emit the pattern of light. With respect to operation 1230, details for operation 510 of FIG. 5 may be applied.

In operation 1240, the augmented reality device 1201 may acquire an image including the pattern of light via at least one camera (e.g., the first camera 311). With respect to operation 1240, details of operation 520 of FIG. 5 may be applied.

In operation 1250, the electronic device 1202 may transmit information on the pattern and information on a first content to the augmented reality device 1201. With respect to the information on the pattern, details have been described above with reference to operation 530 of FIG. 5. According to various embodiments, information on the first content may be information on content to be displayed as the form of a virtual object by the augmented reality device 1201. The information on the first content may include at least one among the remaining battery level of the electronic device 1202, the username of the electronic device 1202, or information based on at least one widget running on the electronic device 1202.

In operation 1260, the augmented reality device 1201 may analyze information on a pattern and an image acquired in operation 1240 to identify at least one among the tilt or position of the display area of the electronic device 1202. With respect to operation 1260, details of operation 540 of FIG. 5 may be applied.

In operation 1270, the augmented reality device 1201 may display a virtual object based on the information on the first content.

In operation 1280, the electronic device 1202 may identify a predetermined trigger. According to various embodiments, the predetermined trigger may be a user input to display a multi-window related to the electronic device 1202 and may be different from the trigger condition described above with reference to FIG. 5. According to various embodiments, the predetermined trigger may include at least one of executing an application for displaying a multi-window in the electronic device 1202 or detecting a designated gesture input in the electronic device 1202.

In operation 1285, the electronic device 1202 may transmit information on the second content to the augmented reality device 1201. According to various embodiments, the information on the second content may be information on an execution screen of at least one application running in the background of the electronic device 1202.

In operation 1290, the augmented reality device 1201 may display a virtual object based on the information on the second content. According to various embodiments, the virtual object may represent an execution screen of at least one application running in the background of the electronic device 1202. According to various embodiments, the augmented reality device 1201 may sense a user's input to the virtual object while displaying the virtual object, and transmit information about the sensed input to the electronic device 1202. After that, the electronic device 1202 may process information about the sensed input as an input about an application whose execution screen is displayed by the virtual object, and may transmit information on the execution screen changed as a result of the processing again to the augmented reality device 1201 so that the virtual object may be updated.

An augmented reality device (e.g., the augmented reality device 300) according to various example embodiments may include: at least one camera (e.g., the first camera 311), a communication circuit (e.g., the communication circuit 370), a display (e.g., the display module 350), and at least one processor (e.g., the processor 320), wherein the at least one processor is configured to: acquire, via the at least one camera, a first image including a pattern of light emitted by an electronic device (e.g., the electronic device 401), receive, via the communication circuit, information on the pattern from the electronic device, based on the information on the pattern and the first image, identify at least one among the tilt or position of the display area of the electronic device, and display a virtual object on the display based on at least one of a tilt or a position of the display area of the electronic device.

According to various example embodiments, the pattern of the light may be displayed on the display area of the electronic device, and the information on the pattern may represent at least one among the position at which the pattern is displayed on the display area, the size of elements included in the pattern, or the gap between the elements.

According to various example embodiments, the light may include light of an infrared area emitted by an infrared sensor of the electronic device.

According to various example embodiments, the pattern of light may be displayed on the edge of the display area.

According to various example embodiments, the at least one processor may be configured to: control the at least one camera at a first frame rate to acquire the first image, receive, via the communication circuit, information on a time when the pattern of light is emitted from the electronic device, and control, based on the information on the time when the pattern of light is emitted, the at least one camera at a second frame rate lower than the first frame rate to acquire a second image including the pattern of light.

According to various example embodiments, the at least one processor may be configured to: receive, via the communication circuit, information on content from the electronic device, and display the virtual object based on the information on the content.

According to various example embodiments, the at least one processor may be configured to, wherein the information on the content may include information on a first application being executed in the electronic device, and the virtual object may include an execution screen of the first application.

According to various example embodiments, a method executed in the augmented reality device may include: acquiring a first image including a pattern of light emitted by the electronic device, receiving information on the pattern from the electronic device, identifying, based on the information on the pattern and the first image, at least one among the tilt or position of a display area of the electronic device, and displaying a virtual object based on at least one among the tilt or position of the display area of the electronic device.

According to various example embodiments, the pattern of light may be displayed on the display area of the electronic device, and the information on the pattern may represent at least one among the position at which the pattern is displayed on the display area, a size of the elements included in the pattern, or a gap between the elements.

According to various example embodiments, the light may include light of an infrared area emitted by an infrared sensor of the electronic device.

According to various example embodiments, the pattern of the light may be displayed on an edge of the display area.

According to various example embodiments, acquiring the first image may be performed by controlling the at least one camera included in the augmented reality device at a first frame rate, and the method may further include: receiving information on the time when the pattern of light is emitted from the electronic device, and controlling, based on the information on the time when the pattern of light is emitted, the at least one camera at a second frame rate lower than the first frame rate to acquire a second image including the pattern of light.

According to various example embodiments, the method may further include: receiving information on content from the electronic device, and displaying the virtual object may include displaying the virtual object based on the information on the content.

According to various embodiments, wherein the information on the content may include information on a first application being executed in the electronic device, and the virtual object may include an execution screen of the first application.

An electronic device (e.g., the electronic device 401) according to various example embodiments may include: a communication circuit (e.g., the communication module 490) and at least one processor (e.g., the display module 420), wherein the at least one processor is configured to: control the electronic device to emit light of a first pattern and transmit information on the first pattern to an augmented reality device (e.g., the augmented reality device 300) via the communication circuit, and the information on the first pattern is used to identify at least one among the tilt or position of a display area of the electronic device in the augmented reality device.

According to various example embodiments, the electronic device may further include the display, and the at least one processor may be configured to display light of the first pattern on the display.

According to various example embodiments, light of the first pattern may be displayed on an edge of a display area of the display.

According to various example embodiments, the at least one processor may be configured to display the light of the first pattern at a first frequency.

According to various example embodiments, the at least one processor may be configured to transmit information showing the first frequency to the augmented reality device via the communication circuit.

According to various example embodiments, the electronic device may further include an infrared sensor, the at least one processor may be configured to control the infrared sensor to emit the light of the first pattern, and light of the first pattern may include light of an infrared area.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An augmented reality device comprising:
at least one camera;
communication circuitry;
a display;
memory storing instructions; and
at least one processor comprising processing circuitry,
wherein the instructions, when executed by at least one processor individually or collectively, cause the augmented reality device to:
acquire, via the at least one camera, a first image comprising a pattern of light emitted by an electronic device;
wirelessly receive, via the communication circuitry, information on the pattern from the electronic device, wherein the information on the pattern includes information on a configurable layout of light pattern elements;
based on the first image and the information on the pattern, identify at least one among a tilt or a position of a display area of the electronic device; and
display, via the display, a virtual object in augmented reality based on at least one of the tilt or the position of the display area of the electronic device.

2. The augmented reality device of claim 1, wherein the pattern of light is displayed on the display area of the electronic device, and
wherein the information on the pattern represents at least one among a position at which the pattern is displayed on the display area, a size of the light pattern elements comprised in the pattern, or a gap between the light pattern elements.

3. The augmented reality device of claim 1, wherein the light pattern elements comprise infrared sensors emitting light of an infrared area.

4. The augmented reality device of claim 2, wherein the pattern of light is displayed on an edge of the display area.

5. The augmented reality device of claim 1, wherein the at least one processor is configured to:
control the at least one camera at a first frame rate to acquire the first image;
receive, via the communication circuitry, information on time when the pattern of light is emitted from the electronic device; and
based on the information on the time when the pattern of light is emitted, control the at least one camera at a second frame rate lower than the first frame rate to acquire a second image comprising the pattern of light.

6. The augmented reality device of claim 1, wherein the instructions, when executed by at least one processor individually or collectively, cause the augmented reality device to:
receive, via the communication circuitry, information on content from the electronic device; and
display the virtual object based on the information on the content.

7. The augmented reality device of claim 6, wherein the information on the content comprises information on a first application being executed in the electronic device, and
wherein the virtual object comprises an execution screen of the first application.

8. A method executed in an augmented reality device, the method comprising:
acquiring a first image comprising a pattern of light emitted by an electronic device;
wirelessly receiving information on the pattern from the electronic device, wherein the information on the pattern includes information on a configurable layout of light pattern elements;
based on the first image and the information on the pattern, identifying at least one among a tilt or a position of a display area of the electronic device; and
displaying a virtual object in augmented reality based on at least one among the tilt or the position of the display area of the electronic device.

9. The method of claim 8, wherein light of the pattern is displayed on the display area of the electronic device, and
wherein the information on the pattern represents at least one among a position at which the pattern is displayed on the display area, a size of the light pattern elements comprised in the pattern, or a gap between the light pattern elements.

10. The method of claim 8, wherein the light pattern elements comprise infrared sensors emitting light of an infrared area.

11. The method of claim 9, wherein the pattern of light is displayed on an edge of the display area.

12. The method of claim 8, the method comprising:
controlling at least one camera included in the augmented reality device at a first frame rate to acquire the first image;
receiving information on time when the pattern of light is emitted from the electronic device; and
based on the information on the time when the pattern of light is emitted, controlling the at least one camera at a second frame rate lower than the first frame rate to acquire a second image comprising the pattern of light.

13. The method of claim 8, the method comprising:
receiving information on content from the electronic device; and
displaying the virtual object based on the information on the content.

14. The method of claim 13, wherein the information on the content comprises information on a first application being executed in the electronic device, and
wherein the virtual object includes an execution screen of the first application.

15. An electronic device comprising:
communication circuitry;
memory storing instructions; and
at least one processor comprising processing circuitry,
wherein the instructions, when executed by at least one processor individually or collectively, cause the electronic device to:
emit light of a first pattern; and
wirelessly transmit information on the first pattern to an augmented reality device via the communication circuitry, wherein the information on the pattern includes information on a configurable layout of light pattern elements, and
wherein the information on the first pattern is used to identify at least one among atilt or a position of a display area of the electronic device in the augmented reality device.

16. The electronic device of claim 15, further comprising a display,
wherein the at least one processor is configured to display light of the first pattern on the display.

17. The electronic device of claim 16, wherein the light of the first pattern is displayed on an edge of a display area of the display.

18. The electronic device of claim 16, wherein the at least one processor is configured to display the light of the first pattern at a first frequency.

19. The electronic device of claim 18, wherein the instructions, when executed by at least one processor individually or collectively, cause the electronic device to transmit information including the first frequency to the augmented reality device via the communication circuitry.

20. The electronic device of claim 15, further comprising infrared sensors,
wherein the instructions, when executed by at least one processor individually or collectively, cause the electronic device to control the infrared sensors to emit the light of the first pattern, and
wherein the light of the first pattern includes light of an infrared area.

* * * * *